US011463750B2

(12) United States Patent
Han et al.

(10) Patent No.: US 11,463,750 B2
(45) Date of Patent: Oct. 4, 2022

(54) METHOD AND APPARATUS FOR TRANSMITTING ADAPTIVE VIDEO IN REAL TIME USING CONTENT-AWARE NEURAL NETWORK

(71) Applicant: KOREA ADVANCED INSTITUTE OF SCIENCE AND TECHNOLOGY, Daejeon (KR)

(72) Inventors: Dongsu Han, Daejeon (KR); Hyunho Yeo, Daejeon (KR); Youngmok Jung, Daejeon (KR); Jaehong Kim, Daejeon (KR); Jinwoo Shin, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 296 days.

(21) Appl. No.: 16/612,498

(22) PCT Filed: Sep. 28, 2018

(86) PCT No.: PCT/KR2018/011602
§ 371 (c)(1),
(2) Date: Nov. 11, 2019

(87) PCT Pub. No.: WO2020/067592
PCT Pub. Date: Apr. 2, 2020

(65) Prior Publication Data
US 2021/0409789 A1    Dec. 30, 2021

(51) Int. Cl.
*H04N 21/2383* (2011.01)
*G06N 3/04* (2006.01)
(Continued)

(52) U.S. Cl.
CPC ....... *H04N 21/2383* (2013.01); *G06N 3/0454* (2013.01); *G06N 3/08* (2013.01); *H04L 67/61* (2022.05)

(58) Field of Classification Search
CPC ....... H04N 21/2383; H04N 21/234354; H04N 21/23439; H04N 21/26258;
(Continued)

(56) References Cited

U.S. PATENT DOCUMENTS

2016/0086078 A1    3/2016   Ji et al.
2017/0264902 A1*   9/2017   Ye .................. G06N 3/084
(Continued)

FOREIGN PATENT DOCUMENTS

KR    10-2016-0034814 A    3/2016
KR    10-2018-0004898 A    1/2018
(Continued)

OTHER PUBLICATIONS

Hyunho Yeo et al., "How will Deep Learning Change Internet Video Delivery?", HotNets-XVI Proceedings of the 16th ACM Workshops on Hot Topics in Networks, Nov. 30-Dec. 1, 2017, pp. 57-64.
(Continued)

*Primary Examiner* — Tracy Y. Li
(74) *Attorney, Agent, or Firm* — Sughrue Mion, PLLC

(57) ABSTRACT

A method and apparatus for transmitting adaptive video in real time using a content-aware neural network are disclosed. At least one embodiment provides a method performed by a server for transmitting an adaptive video in real time by using content-aware deep neural networks (DNNs), including downloading a video, encoding a downloaded video for each of at least one resolution, dividing an encoded video into video chunks of a predetermined size, training the content-aware DNNs by using encoded video, generating a configuration or manifest file containing information on trained content-aware DNNs and information on the encoded video, and transmitting the configuration file upon a request of a client.

9 Claims, 7 Drawing Sheets

(51) Int. Cl.
*G06N 3/08* (2006.01)
*H04L 67/61* (2022.01)

(58) Field of Classification Search
CPC ......... H04N 21/44209; H04N 21/4666; H04N 21/8456; H04N 21/2225; G06N 3/0454; G06N 3/08; H04L 29/08954; H04L 67/34; H04L 65/00
See application file for complete search history.

(56) References Cited

U.S. PATENT DOCUMENTS

2017/0277994 A1    9/2017  Sharifi et al.
2018/0341706 A1\*  11/2018  Agrawal .............. G06V 20/597
2020/0077132 A1\*   3/2020  Sivaramalingam ..........................
                                                        H04N 21/4621

FOREIGN PATENT DOCUMENTS

KR    10-2018-0094024 A    8/2018
WO       2017/055609 A1    4/2017
WO       2017/171949 A1   10/2017

OTHER PUBLICATIONS

International Search Report for PCT/KR2018/011602, dated Jun. 21, 2019.

\* cited by examiner (a) $QoE_{lin}$ (b) $QoE_{log}$ (c) $QoE_{hd}$ (a) $QoE_{lin}$ (b) $QoE_{log}$ (c) $QoE_{hd}$

METHOD AND APPARATUS FOR TRANSMITTING ADAPTIVE VIDEO IN REAL TIME USING CONTENT-AWARE NEURAL NETWORK

TECHNICAL FIELD

The present disclosure in some embodiments relates to a method and apparatus for transmitting adaptive video in real time using a content-aware neural network.

BACKGROUND

The statements in this section merely provide background information related to the present disclosure and do not necessarily constitute prior art.

Video streaming services have grown rapidly over the last few decades. The dependence of the quality of the video streaming service on the transmission bandwidth leads to degradation of the user Quality of Experience (QoE) under poor network conditions. To tackle this issue, the server side uses distributed computing technologies, and the client or user side has Adaptive Bit-Rate (ABR) streaming to address the problem of bandwidth heterogeneity and its variations across time and space. However, these technologies are not completely independent of transmission bandwidth.

Other attempts to improve the quality of video streaming services include using better codecs, optimizing adaptive bitrate algorithms, choosing better servers and content distribution networks (CDNs), and using coordination between clients and servers through a central control plane.

DISCLOSURE

Technical Problem

The present disclosure in some embodiments seeks to provide a user with a high quality video streaming service. At least one embodiment provides the same quality of video streaming services with a substantial saving of bandwidth from the prior art.

SUMMARY

At least one aspect of the present disclosure provides a method performed by a server for supporting a client and transmitting an adaptive video in real time by using content-aware deep neural networks (DNNs), including downloading a video, encoding a downloaded video for each of at least one resolution, dividing an encoded video into video chunks of a predetermined size, training the content-aware DNNs by using encoded video, generating a configuration or manifest file containing information on trained content-aware DNNs and information on the encoded video, and transmitting the configuration file upon a request of the client.

Another aspect of the present disclosure provides a server apparatus for supporting a client and transmitting an adaptive video in real time by using content-aware deep neural networks (DNNs), includes a transmission and reception unit and a control unit. The transmission and reception unit is configured to download a video and to transmit a configuration or manifest file at the client's request. The control unit is configured to encode a downloaded video for each of at least one resolution, to divide an encoded video into video chunks of a predetermined size, to train the content-aware DNNs by using encoded video, and to generate a configuration file containing information on trained content-aware DNNs and information on the encoded video.

Yet another aspect of the present disclosure provides a method performed by a client for transmitting an adaptive video in real time by using content-aware deep neural networks (DNNs), downloading, from a server apparatus, a configuration file for a video to be downloaded, measuring an inference time required to execute the content-aware DNNs by using information stored in the configuration file, determining an object to download by using a performance of the client and a measured inference time, downloading a determined object from the server apparatus, storing a downloaded object in a buffer when the downloaded object is a video, and adding the downloaded object to the content-aware DNNs when the downloaded object is a content-aware DNN chunk, enhancing a quality of a video stored in the buffer by using the content-aware DNNs, and reproducing the video after the enhancing of the quality in real time.

Yet another aspect of the present disclosure provides a client apparatus for transmitting an adaptive video in real time by using content-aware deep neural networks (DNNs), including a transmission and reception unit and a control unit. The transmission and reception unit is configured to download, from a server apparatus, a configuration or manifest file for a video to be downloaded, and to download a determined object from the server apparatus. The control unit is configured to measure an inference time required to execute the content-aware DNNs by using information stored in the configuration file, to determine an object to download by using a performance of the client and a measured inference time, to store a downloaded object in a buffer when the downloaded object is a video, and add the downloaded object to the content-aware DNNs when the downloaded object is a content-aware DNN chunk, to enhance a quality of a video stored in the buffer by using the content-aware DNNs, and to thereby reproduce in real time the video with the quality enhanced.

Advantageous Effects

As described above, at least one embodiment can provide a user with a high quality video streaming service. In addition, by using a content-aware deep neural network (DNN), a high quality video streaming service can be provided to a user in real time, and the client can optimize the video streaming service by considering in real time the hardware resource (or performance) in possession. According to at least one embodiment, with reduced transmission bandwidth required to provide the content, the content provider or the CDNs (content distribution networks) operator can deliver the same quality video at a lower cost.

DETAILED DESCRIPTION

Figure 1:
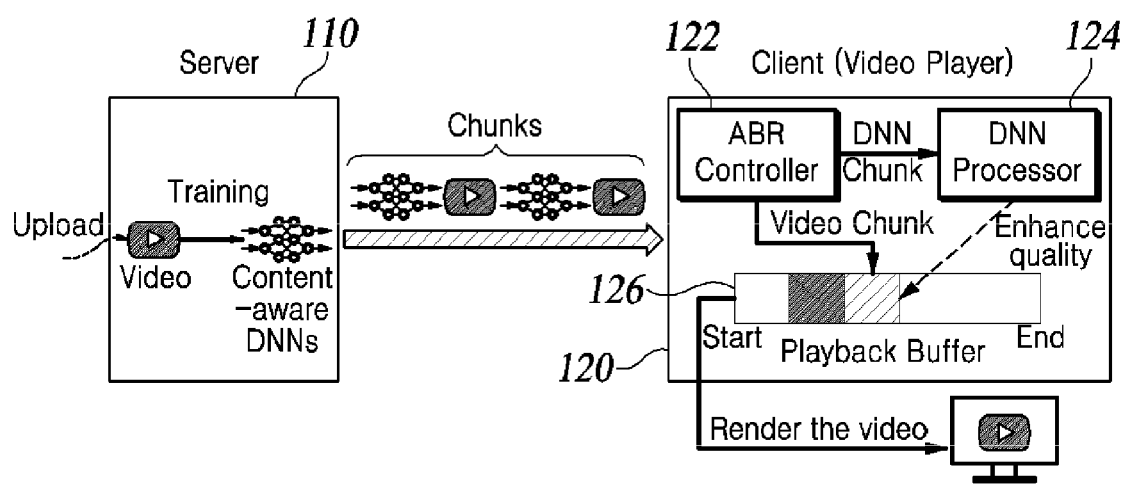
FIG. 1 is a schematic diagram of a system according to at least one embodiment of the present disclosure.

Hereinafter, some embodiments of the present disclosure will be described in detail with reference to the accompanying drawings. In the following description, like reference numerals designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely for the purpose of differentiating one component from the other, not to imply or suggest the substances, the order or sequence of the components. Throughout this specification, when a part "includes" or "comprises" a component, the part is meant to further include other components, not to exclude thereof unless specifically stated to the contrary. The terms such as "unit," "module," and the like refer to one or more units for processing at least one function or operation, which may be implemented by hardware, software, or a combination thereof.

FIG. 1 is a schematic diagram of a system according to at least one embodiment of the present disclosure.

Referring to FIG. 1, a neural adaptive streaming (hereinafter, NAS) system according to at least one embodiment of the present disclosure is configured to include a server 110 storing at least one video clip and a client 120 capable of downloading and playing the video from the server 110 in real time.

NAS can be implemented in other streaming as well than in HTTP adaptive streaming, standardized in Dynamic Adaptive Streaming over HTTP (DASH).

Responsive to a video clip uploaded, the server 110 encodes the same at multiple bitrates and divides and stores the video in chunks. In addition, the server 110 trains content-aware Deep Neural Networks (DNNs) to be used by the client 120 for the video quality enhancement. Thereafter, the server 110 may store information about trained content-aware DNNs, bitrates, resolutions, URLs for downloading the encoded video chunks, and the like in a configuration file (e.g., a manifest file).

The server 110 may include a video transmission and reception unit (not shown) configured to receive the video and transmit the configuration file and a control unit (not shown) configured to encode the downloaded video, divide the downloaded video into a predetermined size, and learn using the content-aware DNNs.

The client 120 may download a video, available content-aware DNNs, a configuration file, and the like from the server 110. The client 120 may first download the configuration file to determine the content-aware DNN and bitrate to be used by the client 120, and download the determined content-aware DNN and video of the determined bitrate. The client 120 may include an ABR controller 122, a DNN processor 124, and a buffer 126 for storing video chunks to be played. The ABR controller 122 may take account of the current performance of the client 120 to select the bitrates of a video to be reproduced and select content-aware DNNs or video as an object to be downloaded. The DNN processor 124 may use a light-weight mechanism to choose the best available mechanism that fits the resource of the client 120. The client 120 transfers the content-aware DNN when downloaded from the server 110 to the DNN processor 124 and the video when downloaded to the buffer 126. The DNN processor 124 initializes the content-aware DNN upon receiving the same. The content-aware DNN performs quality enhancement on a per-frame basis. The DNN processor 124 then applies the super resolution DNN to the downloaded and stored video in the buffer 126 for causing the resulting frames to be re-encoded into quality-enhanced video chunks which are stored in the buffer 126 in place of the original chunks. Alternatively, the DNN processor 124 may generate and play back a quality-enhanced video directly by using the downloaded and stored video in the buffer 126. As a result, the quality enhancement will show in the actually played video chunk. The decoding, content-aware DNN, and encoding phases may be pipelined and parallelized to minimize latency.

The client 120 may include a transmission and reception unit and a control unit (both not shown). The transmission and reception unit is configured to download a configuration file for the video to be downloaded from the server 110, and to download the video and at least one content-aware DNN. The control unit is configured to measure an inference time for performing the content-aware DNNs by using information stored in the configuration file, to determine an object to be downloaded by using the performance of this client and the measured inference time, to store the object downloaded in a buffer when the object downloaded is a video, to add the object downloaded to the content-aware DNN when the object downloaded is part of the content-aware DNN, and to utilize the content-aware DNN for enhancing the quality of the video stored in the buffer, thereby reproducing an enhanced-quality video in real time.

Although the server 110 and the client 120 has been described as separate configurations of a control unit and a transmission and reception unit, they may be implemented as a single integrated configuration, or each configuration may be implemented as multiple divided configurations.

Although FIG. 1 illustrates the server and the client separately, a proxy server may be further included between the server and the client. In that case, the proxy server may perform the functions of the client described in FIG. 1 except for real-time video playback, and the client may receive and play the available video for playback from the proxy server in real time.

Figure 2:
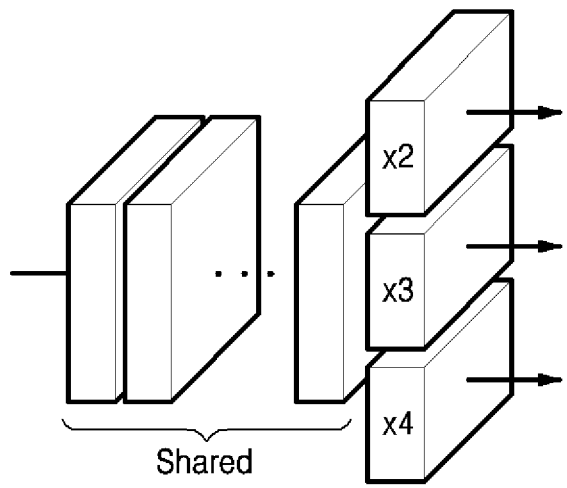
FIG. 2 is a diagram of a DNN that supports an adaptive bitrate.

FIG. 2 is a diagram of a DNN that supports an adaptive bitrate.

Typical DNNs are difficult to support adaptive bitrate or to facilitate adaptive streaming. In order to support the adaptive bitrate, DNN needs to be capable of taking multiple resolutions as input and the DNN inference needs to take place in real-time. In other words, the system needs to use DNN to improve the video quality, and when the client supports adaptive bitrate, the server needs to train the DNN for each of various bitrates (or resolutions). Here, the bitrates are specifically related to the resolutions. For example, in order to play high-resolution video in real time, the bitrate is supposed to be high, but playing of low-resolution video in real time does not need the bitrate to be high. In addition, the video size (horizontal and vertical) may also affect resolution and bitrate.

FIG. 2 shows, for example, a DNN that inputs a video chunk having a resolution (e.g., 240p, 360p, 480p, 720p) and outputs a video chunk having 1080p. In this case, the DNNs may be composed of blocks (that is, layers) to be applied independent of the input resolution and blocks to be applied dependent on the input resolution. As such, a system capable of training DNNs on different low-resolution video chunks (or images) to output high-resolution video chunks is called a Multi-scale Deep Super Resolution (MDSR) system.

Figure 3:
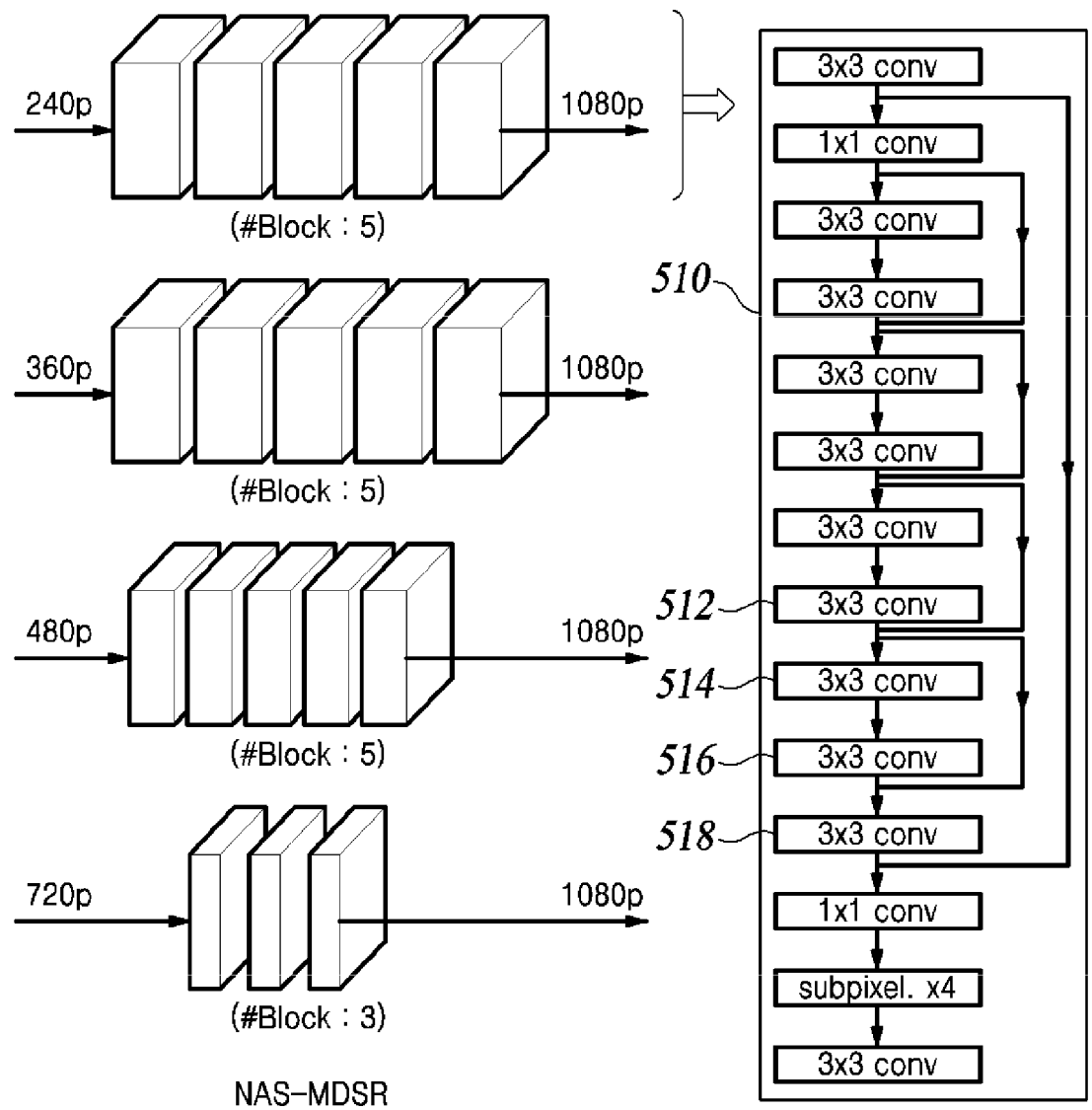
FIG. 3 is a diagram of DNNs for supporting adaptive bitrates according to at least one embodiment of the present disclosure.

FIG. 3 is a diagram of DNNs for supporting adaptive bitrates according to at least one embodiment of the present disclosure.

Such DNN as FIG. 2 can reduce the storage space because some blocks are arranged to be shared independent of the input video resolution which, however, may drastically affect the inference time. For example, the inference time of a 720p video chunk may be 4.3 times more than that of a 240p video chunk. When the 240p video input is successfully processed in real time, the 720p video input may be not. Downscaling the DNN size in an attempt to meet the real-time constraint for the higher-resolution video playback will make a lower-resolution video suffer from significant quality degradation.

To tackle the challenge, at least one embodiment uses a separate network for each resolution of the video input. In addition, each DNN may be configured to adapt to the client's temporal variation in capability. For example, a DNN 510 of the video chunk having a resolution of 240p may be composed of 14 layers, and the client's temporal variation in computing power may be accounted for executing an eighth layer 512 followed by skipping a ninth layer 514 and a tenth layer 516 before executing an eleventh layer 518. In other words, when the DNN inference time is sufficient to play the video in real time, all the layers can be executed. Otherwise, the client is allowed to bypass execution of some layers. This is described in detail in FIG. 5.

Information about the DNN may be the resolution of the input video, the number of layers, the number of channels, the capacity of the DNN, the quality of the output video, and the like. The server may store the information about the DNN in a configuration or manifest file.

Figure 4:
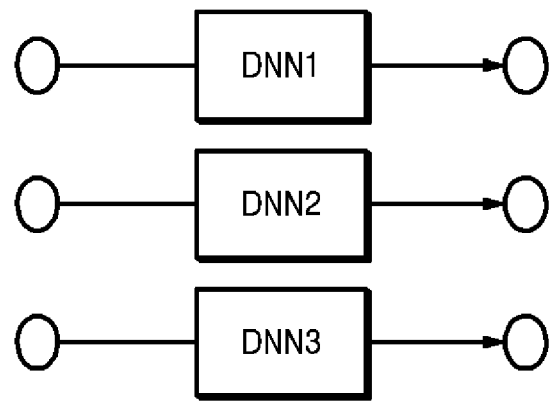
FIG. 4 is a schematic diagram of content-aware DNNs according to at least one embodiment of the present disclosure.

FIG. 4 is a schematic diagram of content-aware DNNs according to at least one embodiment of the present disclosure.

Developing a universal DNN model that works well across all Internet video is impractical because of the almost infinite number of video episodes. Accordingly, the present disclosure in at least one embodiment employs a content-aware DNN model in which a different DNN is used for each video episode (i.e., background, environment, etc.). However, for episodes with similar backgrounds, environments, characters, etc., the same content-aware DNN may be used. In terms of time or cost, it may be inefficient to train content-aware DNNs that take into account the resolution of the input video, the quality of the output video, as well as the video episodes. The present disclosure in at least one embodiment tackles the challenge by training the content-aware DNN model to learn the most commonly used episodes as the generic model, and thereafter learn other episodes based on the generic model to reduce the training time or cost. The most used episode may be one, but may be multiple.

Figure 5:
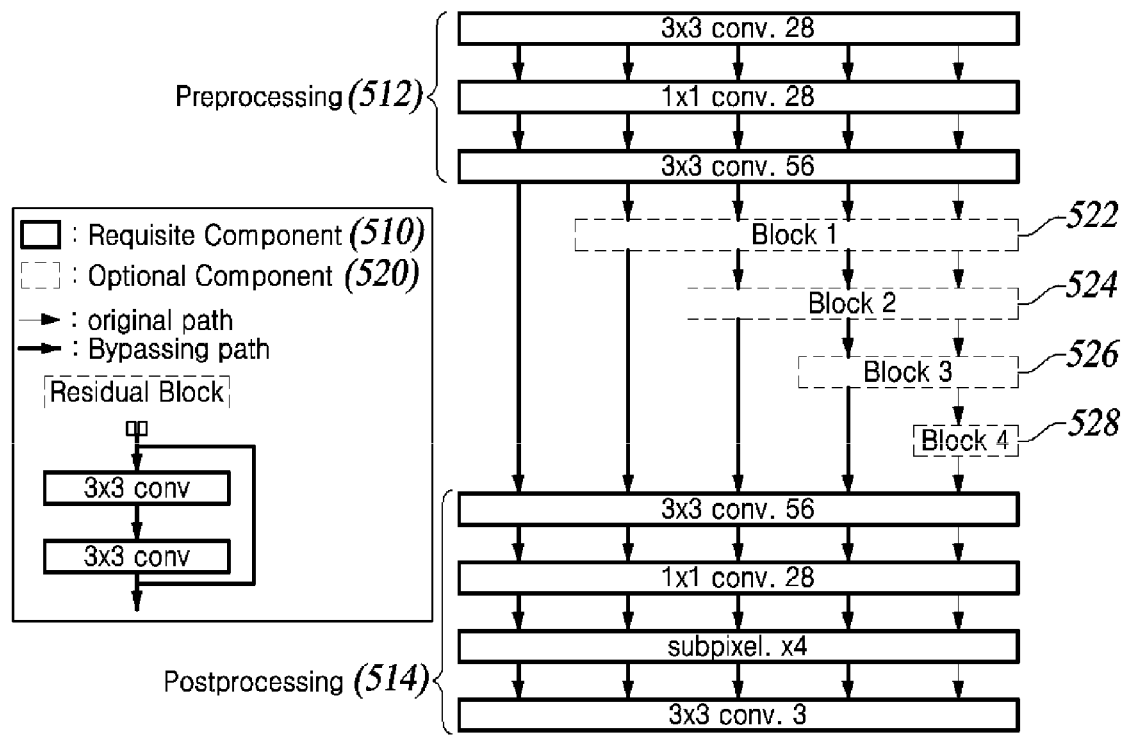
FIG. 5 is a diagram of a scalable content-aware DNN according to at least one embodiment of the present disclosure.

FIG. 5 is a diagram of a scalable content-aware DNN according to at least one embodiment of the present disclosure.

According to at least one embodiment of the present disclosure, the content-aware DNN is scalable. The content-aware DNN may be divided into a requisite component 510 and an optional component 520. The requisite component 510 needs to be executed, but not the optional component 520. The requisite component 510 may be comprised of preprocessing 512 and postprocessing 514. Optional component 520 may be comprised of multiple residual blocks 522, 524, 526, and 528. In addition, the multiple residual blocks 522, 524, 526, and 528 may each be configured with two convolutional layers. Running the optional component 520 results in better quality of video being played.

When the server supports the scalable content-aware DNN, the server needs to train all inference paths to learn the video depending on whether the requisite component 510 and optional component 520 are included. Thus, the route may vary. The training may be performed by randomly designating paths across layers in a way to lessen the error between the output video and the original video. When the training is finished, the server may divide and store the scalable content-aware DNNs into chunk units, and save the places where the divided scalable content-aware DNNs are stored as URLs in the video configuration or manifest file.

When the client uses the scalable content-aware DNNs, it may first download the requisite component 510 and take account of the real-time performance (or resource) of the client 120 to determine whether to execute the optional component 520 and the configuration for that execution (522, 524, 526, and 528) during a video streaming service. The client may first calculate the amount of time remaining until the playback time of the video chunk which is processing, and then calculate the maximum number of available layers of the scalable content-aware DNNs. To this end, the client may use a look-up table for recording the number of layers and the inference time for each layer. The client may also determine whether to download the optional component 520 from the server. For example, when a client uses a video streaming service while downloading a file, the client may only execute the requisite component 510 of the scalable content-aware DNN because there is not enough resources available for the video streaming service. However, when the client only uses the video streaming service, then the optional component 520 may also be executed as well as the requisite component 510. The client's utilization of a scalable content-aware DNN enables a quick video streaming service to be offered by performing only the requisite component 510 at the start of the transmission. In addition, the real-time reflection of the client's resources of the client allows the user to receive the video streaming service without delay.

Figure 6:
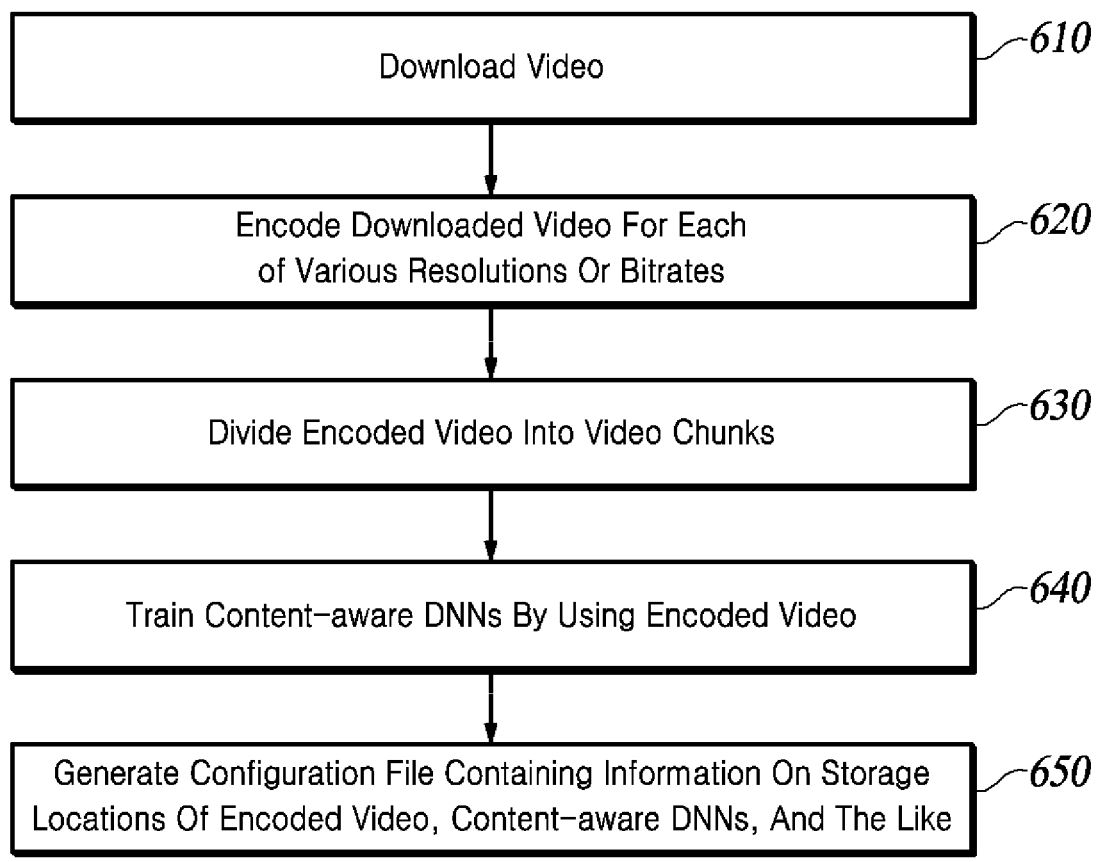
FIG. 6 is a flowchart of a server operation according to at least one embodiment of the present disclosure.

FIG. 6 is a flowchart of a server operation according to at least one embodiment of the present disclosure.

The server downloads a video from another device (Step 610). The video is intended to be provided for various clients.

The server encodes the downloaded video for each of various resolutions or bitrates (Step 620). Resolution is specifically related to bitrate. For example, in order to play high-resolution video in real time, the bitrate needs to be high, but real-time playing of low-resolution video does not need the bitrate to be high. The video size (horizontal and vertical) may also affect the resolution and bitrate.

The server divides the encoded video into chunks (Step 630).

The server trains content-aware DNNs by using the encoded video chunks (Step 640). The content-aware DNNs may each be separately trained for each resolution, or they may be trained by using a generic model. When a generic model is not available, an initialized model may be used.

The server generates in a configuration or manifest file, information on storage locations of the encoded video, the content-aware DNNs, and the like (Step 650). Information about the trained content-aware DNNs, bitrates, resolutions, URLs for downloading encoded video, and the like may be stored in the configuration file. In this case, the information about the trained content-aware DNNs may be an index value.

Figure 7:
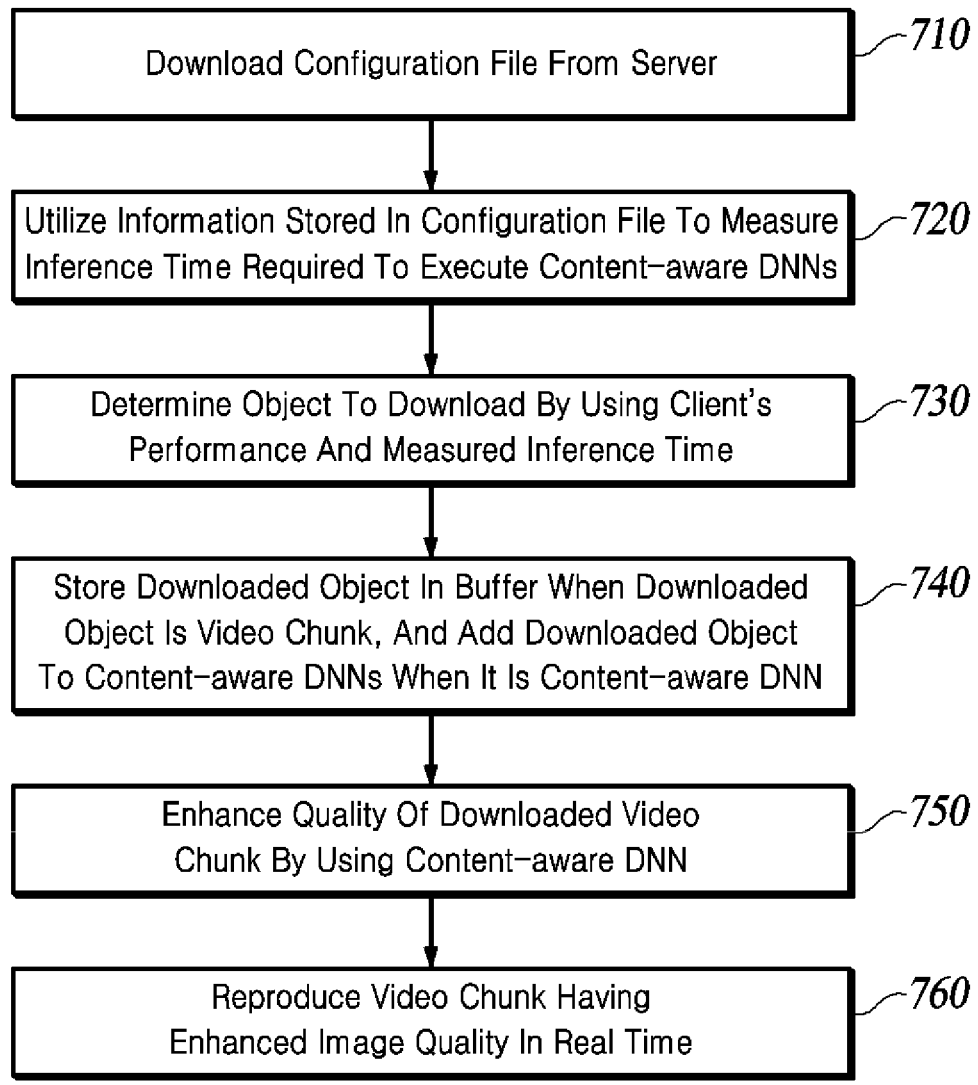
FIG. 7 is a flowchart of a client operation according to at least one embodiment of the present disclosure.

FIG. 7 is a flowchart of a client operation according to at least one embodiment of the present disclosure.

First, the client downloads a configuration file for the video to be downloaded from the server (Step 710). In addition to the information about the video to be downloaded, the configuration file includes information about content-aware DNNs to be used for enhancing the quality of the video. The information about the content-aware DNNs may be index information of the content-aware DNNs. When there are content-aware DNNs that the client has in store, information about the same can be shared with the server. Thereafter, the client may download only the video in response to an indication of the content-aware DNNs stored in the configuration file.

The client utilizes the information stored in the configuration file to measure the inference time required to execute the content-aware DNNs (Step 720). To measure the inference time, one may consider downloading content-aware DNNs stored in the configuration file for all options. However, this can waste unnecessary resources and time. Accordingly, in at least one embodiment of the present disclosure, the client randomly configures content-aware DNNs by using information on the options stored in the configuration file rather than downloading all of the content-aware DNNs. Specifically, instead of downloading the content-aware DNNs to be actually used, content-aware DNNs are randomly configured by using the resolutions, quality level, number of layers, and number of channels of the input video which are stored in the configuration file, in order to measure the inference time. In this case, since the time required for the client to test the four DNN options is less than the ordinary playing time of the video chunks, the client can determine which options of content-aware DNN to use before playing the second video chunk. Alternatively, the client may store inference time required to perform each DNN option in advance and select the content-aware DNNs to use.

The client determines what object to download by using the client's performance and the measured inference time (Step 730). The client may utilize an integrated adaptive bitrate (ABR) algorithm to download a video to be played later or content-aware DNNs. The integrated ABR algorithm uses a reinforcement learning (RL) framework that directly optimizes the target metric and adopts Asynchronous Advantage Actor-Critic (A3C) as a deep learning algorithm. In particular, A3C learns a strategy (or policy) from observations and produces a mapping from raw observations, such as the fraction of content-aware DNN model downloaded, the quality improvement thanks to content-aware DNN, network throughput samples, and buffer occupancy, to the aforementioned decisions.

In the reinforcement learning (RL), an agent interacts with an environment. For each iteration t, the agent takes an action $a_t$, after observing a state $s_t$ from the environment. The environment then produces a reward $r_t$ and updates its state to $s_{t+1}$. A policy π is defined as a function that gives the probability of taking action $a_t$ at given state $s_t$ as follows.

$$\pi(s_t, a_t) \rightarrow [0,1]$$

The goal then is to learn policy π that maximizes the sum of future discounted reward $\Sigma_{t=0}^{\infty} \gamma^t r_t$, where $\gamma \in (0,1)$ is a discount-rate for future reward.

In addition, the set of actions $\{a_t\}$ to designate may include whether to download a content-aware DNN chunk or to download a video chunk of a specific bitrate. Reward $r_t$ may be the QoE metric which is a function of bitrate utility, rebuffering time, and smoothness of selected bitrates. State $s_t$ may include the number of remaining content-aware DNN chunks to download, throughput measurements, and client measurements (e.g., the buffer occupancy, past bitrates). Thereafter, the environment produces the reward and updates its state reflecting the content-aware DNN downloading and the quality enhancement. The content-aware DNN downloading may update its state by decrementing 'the number of remaining content-aware DNN chunks'. The reward to each video chunk downloaded may be updated to be reflected on the content-aware DNN-based quality enhancement. The quality enhancement may be a function of a portion of the downloaded content-aware DNN. In particular, the bitrate utility component of QoE can be improved according to the average quality enhancement provided by the content-aware DNN. Table 1 summarizes state $s_t$ according to at least one embodiment of the present disclosure.

TABLE 1

| Type | State ($S_t$) |
| --- | --- |
| DNN status | Number of remaining content-aware DNN chunks |
| Network status | Throughput for past N chunks |
| | Download time past N chunks |
| Client status | Occupancy of buffer for storing video for playback |
| | Next video chunk sizes |
| Video status | Bitrate of the latest video chunk |
| | Number of remaining video chunks |

The reinforcement learning (RL) has two neural approximators: an actor representing the policy and a critic used to assess the performance of the policy. At least one embodiment uses the policy gradient method to train the actor and critic networks. The agent first generates trajectories following the current policy $\pi_\theta(s_t, a_t)$, where θ may represent parameters (or weights) of the actor's neural network. The critic network observes these trajectories and learns to estimate the action-value function $Q^{\pi_\theta}(s_t, a_t)$ which is the total expected reward with respect to taking action $a_t$ starting at state $s_t$ and following policy $\pi_\theta$.

$$\theta \leftarrow \theta + \alpha \sum_t \nabla_\theta \log \pi_\theta(s_t, a_t)(Q^{\pi_\theta}(s_t, a_t) - V^{\pi_\theta}(s_t))$$

Here, $V^{\pi_\theta}(s_t)$ is a value function representing the total expected compensation of $\pi_\theta$ starting at state $s_t$, and α is the learning rate. In the reinforcement learning according to the present disclosure, since the reward reflects the average QoE enhancement that the content-aware DNN delivers, the critic network learns to estimate the updated total reward. This allows the actor to learn the policy that balances video and DNN downloads to maximize the QoE.

Referring back to FIG. 7, the client stores the downloaded object in a buffer when the downloaded object is a video chunk, and adds the downloaded object to the content-aware DNNs when it is a content-aware DNN chunk (Step 740).

The client enhances the quality of the downloaded video chunk by using the content-aware DNN (Step 750). The client may use a dedicated DNN processor for performing the DNN.

The client reproduces the video chunk having the enhanced image quality in real time (Step 760).

Although the steps in FIGS. 6 and 7 are described to be sequentially performed, they merely instantiate the technical idea of some embodiments of the present disclosure. Therefore, a person having ordinary skill in the pertinent art could appreciate that various modifications, additions, and substitutions are possible by changing the sequences described in FIGS. 6 and 7 or by performing two or more of the steps in parallel, without replacing from the gist and the nature of the embodiments of the present disclosure, and hence the steps in FIGS. 6 and 7 are not limited to the illustrated chronological sequences.

The steps shown in FIGS. 6 and 7 can be implemented as computer-readable codes on a computer-readable recording medium. The computer-readable recording medium includes any type of recording device on which data that can be read by a computer system are recordable. Examples of the computer-readable recording medium include a magnetic recording medium (e.g., a ROM, a floppy disk, a hard disk, etc.), an optically readable medium (e.g., a CD-ROM, a DVD, etc.), and the like, and also include one implemented in the form of a carrier wave (e.g., transmission through the Internet). Further, the computer-readable recording medium can be distributed in computer systems connected via a network, wherein computer-readable codes can be stored and executed in a distributed mode.

Figure 8:
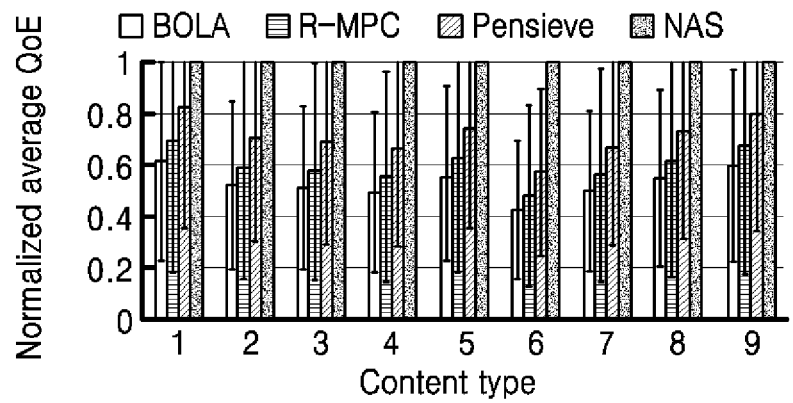
FIG. 8 is diagrams of the average QoE of at least one embodiment of the present disclosure compared with the related art for nine video episodes.
Figure 8:
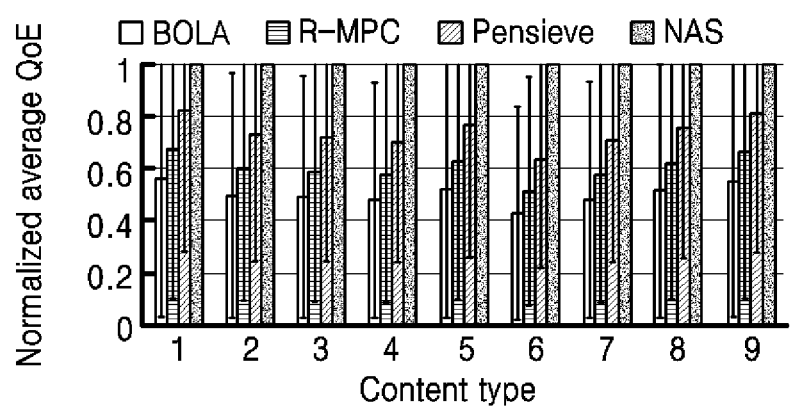
Figure 8:
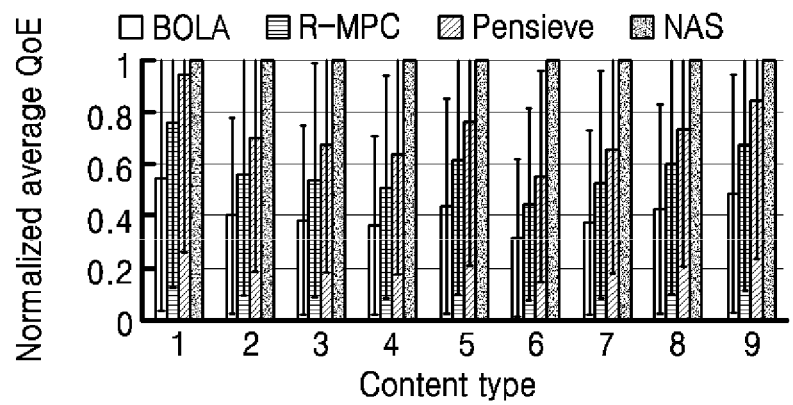

FIG. 8 is diagrams of the average QoE of at least one embodiment of the present disclosure compared with the related art for nine video episodes.

Specifically, a comparison has been performed by using nine video episodes that are of 1080p quality and whose length is longer than 5 minutes and by conducting training for 10 hours by using randomly selected 80% of traces for training. Pensieve represents the technology that uses deep reinforcement learning to maximize QoE. MPC represents the technology that uses buffer occupancy and throughput predictions over next five chunks to select the bitrate that maximizes QoE. In addition, BOLA represents the technology that uses Lyapunov optimization based on buffer occupancy.

Some embodiments utilize three types of QoE metrics of $QoE_{lin}$, $QoE_{log}$, and $QoE_{hd}$. $QoE_{lin}$ uses a linear bitrate utility. $QoE_{log}$ uses a logarithmic bitrate utility function that represents its decreasing marginal utility. $QoE_{hd}$ prefers high-definition (HD) video to non-HD one. The error bars in FIG. 8 indicate one standard deviation from the average. NAS according to at least one embodiment of the present disclosure exhibits the highest QoE across all video episodes over all three QoE metrics. NAS consistently outperforms Pensieve by a large margin across all QoE metrics, that is, $QoE_{lin}$ being 43.08% better, $QoE_{log}$ 36.26% better, and $QoE_{hd}$ 42.57% better. With $QoE_{lin}$, NAS outperforms Pensieve 43.08% on average, whereas Pensieve achieves a 19.31% improvement over MPC. Compared to BOLA, NAS achieves 92.28% improvement in $QoE_{lin}$. The QoE improvement varies across video episodes from 21.89% (Beauty) to 76.04% (Music) over Pensieve because many factors affect the DNN performance, such as the scene complexity, compression artifacts, and temporal redundancy.

Figure 9:
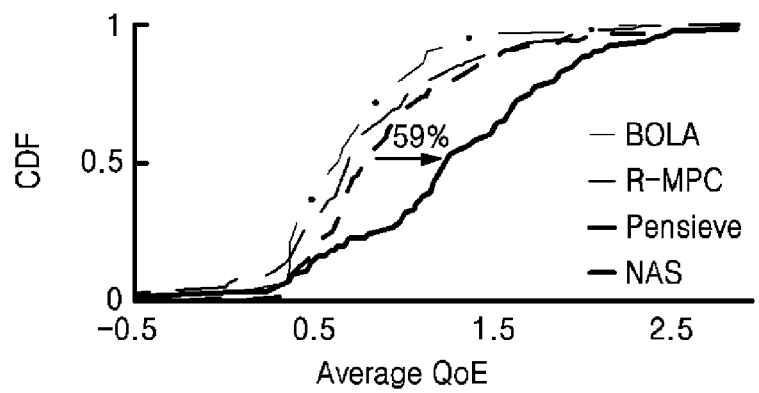
FIG. 9 is diagrams of a cumulated QoE of at least one embodiment of the present disclosure compared with the related art.
Figure 9:
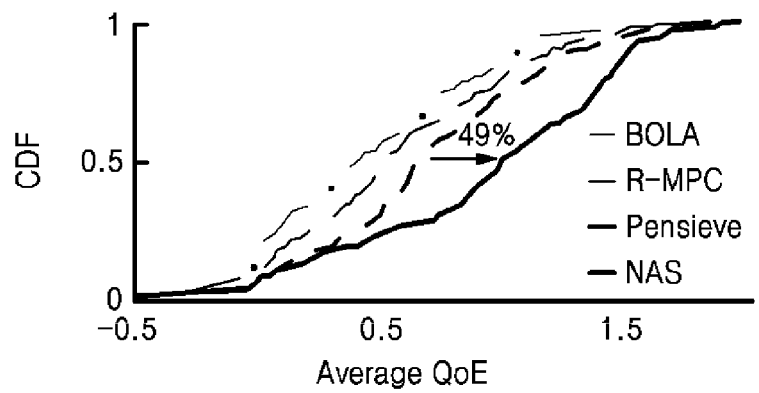
Figure 9:
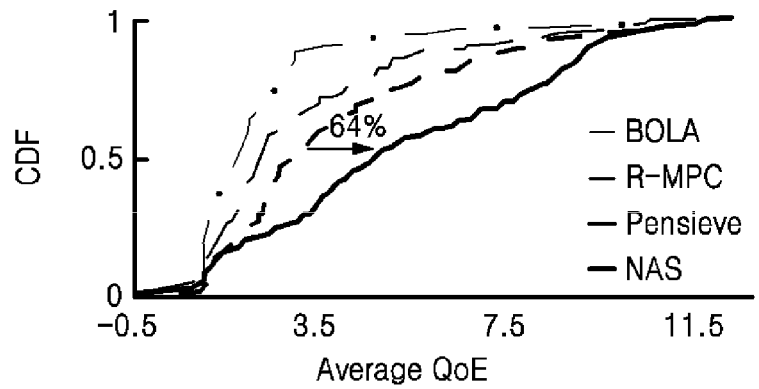

FIG. 9 is diagrams of a cumulated QoE of at least one embodiment of the present disclosure compared with the related art.

FIG. 9 shows the cumulative distribution of QoE over more than 103 network traces by using the gaming episode which shows medium gain among nine video episodes of FIG. 8. NAS provides benefit across all network conditions. For example, NAS improves the median $QoE_{lin}$ by 58.55% over Pensieve. It should be noted that Pensieve mainly delivers its QoE gain over MPC by reducing rebuffering at the cost of bitrate utility. In contrast, NAS does not exhibit such tradeoff because it uses client-side computation. Although not illustrated, other video episodes display a similar trend.

Although exemplary embodiments of the present disclosure have been described for illustrative purposes, those skilled in the art will appreciate that various modifications, additions and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

The invention claimed is:

1. A method performed by a server for transmitting an adaptive video in real time by using content-aware deep neural networks (DNNs), the method comprising:
   downloading a video;
   encoding a downloaded video for each of at least one resolution;
   dividing an encoded video into video chunks of a predetermined size;
   training the content-aware DNNs by using the encoded video;
   generating a configuration file containing information on trained content-aware DNNs and information on the encoded video; and
   transmitting the configuration file upon a request of a client.

2. The method of claim 1, wherein the configuration file comprises information about a storage location of the encoded video.

3. The method of claim 1, wherein the configuration file comprises information about at least one of a layer count, a channel count, storage locations, sizes, and degrees of quality enhancement of the trained content-aware DNNs.

4. The method of claim 1, wherein the content-aware DNNs each comprises a requisite component that is necessarily executed and an optional component that is optionally executed.

5. A server apparatus for transmitting an adaptive video in real time by using content-aware deep neural networks (DNNs), the server apparatus comprising:
   a transmission and reception unit configured to download a video and to transmit a configuration file at a client's request; and
   a control unit configured
      to encode a downloaded video for each of at least one resolution,
      to divide an encoded video into video chunks of a predetermined size,
      to train the content-aware DNNs by using the encoded video, and
      to generate the configuration file containing information on trained content-aware DNNs and information on the encoded video.

6. The server apparatus of claim 5, wherein the information on the encoded video includes at least one of storage locations, resolutions, and bitrates of the encoded video.

7. The server apparatus of claim 5, wherein the information on the trained content-aware DNNs includes at least one of a layer count, a channel count, storage locations, sizes, and degrees of quality enhancement of the trained content-aware DNNs.

8. The server apparatus of claim 1, wherein the content-aware DNNs each comprises a requisite component that is necessarily executed and an optional component that is optionally executed.

9. The method of claim 1, wherein the training the content-aware DNNs comprises training the content-aware DNNs by processing the encoded video through a plurality of different processing paths, and
   wherein the plurality of different processing paths comprises a first processing path that includes only requisite neural network layers, and a second image processing path that includes redundant layers in addition to the requisite neural network layers.

\* \* \* \* \*